(12) United States Patent
Pfeilschifter

(10) Patent No.: US 12,208,695 B2
(45) Date of Patent: Jan. 28, 2025

(54) VEHICLE ELECTRICAL SYSTEM

(71) Applicant: Vitesco Technologies GmbH, Regensburg (DE)

(72) Inventor: Franz Pfeilschifter, Munich (DE)

(73) Assignee: VITESCO TECHNOLOGIES GBMH, Regensburg (DE)

(*) Notice: Subject to any disclaimer, the term of this patent is extended or adjusted under 35 U.S.C. 154(b) by 161 days.

(21) Appl. No.: 17/768,338

(22) PCT Filed: Oct. 7, 2020

(86) PCT No.: PCT/EP2020/078142
§ 371 (c)(1),
(2) Date: Apr. 12, 2022

(87) PCT Pub. No.: WO2021/078518
PCT Pub. Date: Apr. 29, 2021

(65) Prior Publication Data
US 2023/0406123 A1     Dec. 21, 2023

(30) Foreign Application Priority Data

Oct. 21, 2019 (DE) .................. 102019007347.9

(51) Int. Cl.
*B60L 53/14* (2019.01)
*B60L 53/22* (2019.01)

(52) U.S. Cl.
CPC .............. *B60L 53/14* (2019.02); *B60L 53/22* (2019.02); *B60L 2210/10* (2013.01); *B60L 2240/547* (2013.01)

(58) Field of Classification Search
CPC ...... B60L 53/14; B60L 53/22; B60L 2210/10; B60L 2240/547; B60L 2210/00;
(Continued)

(56) References Cited

U.S. PATENT DOCUMENTS

| 9,331,504 B2 | 5/2016 | Butzmann |
| 9,774,215 B2 | 9/2017 | Mizuno |

(Continued)

FOREIGN PATENT DOCUMENTS

| CN | 1298818 A | 6/2001 |
| CN | 103250321 A | 8/2013 |

(Continued)

OTHER PUBLICATIONS

Office Action (First Office Action) issued Dec. 22, 2023, by the State Intellectual Property Office of People's Republic of China in corresponding Chinese Patent Application No. 202080073751.X and an English translation of the Office Action. (22 pages).

(Continued)

*Primary Examiner* — Paul Dinh

(74) *Attorney, Agent, or Firm* — Buchanan Ingersoll & Rooney PC

(57) ABSTRACT

A vehicle electrical system is equipped with at least one high-voltage consumer, a DC charging connection a rechargeable battery, a rectifier and a changeover switch. The high-voltage consumer is connected to the rechargeable battery by the changeover switch via a first switching device in a first switching position of the changeover switch and is connected to the rechargeable battery by the changeover switch in a second switching position of the changeover switch via a second switching device, wherein the DC charging connection is connected to the rechargeable battery via the first switching device.

10 Claims, 1 Drawing Sheet

(58) Field of Classification Search
CPC .......... B60L 1/10; B60L 3/0046; B60L 53/11; B60L 53/20; B60L 58/10; B60L 50/60; Y02T 10/70; Y02T 10/7072; Y02T 90/14; B60Y 2200/91
USPC .......................................................... 320/104
See application file for complete search history.

(56) References Cited

U.S. PATENT DOCUMENTS

| | | | |
|---|---|---|---|
| 10,283,990 | B2 | 5/2019 | Fuchs et al. |
| 10,763,690 | B2 | 9/2020 | Pefilschifter et al. |
| 10,919,467 | B2 | 2/2021 | Link et al. |
| 11,021,065 | B2 | 6/2021 | Waag et al. |
| 11,097,626 | B2 | 8/2021 | Pefilschifter et al. |
| 11,104,232 | B2 | 8/2021 | Mittnacht et al. |
| 11,207,993 | B2 | 12/2021 | Pfeilschifter et al. |
| 2013/0234675 | A1 | 9/2013 | King et al. |
| 2014/0159478 | A1* | 6/2014 | Ang ................ B60L 1/003 307/9.1 |
| 2016/0089998 | A1* | 3/2016 | Thömmes ............ B60L 3/0069 701/22 |
| 2017/0267105 | A1* | 9/2017 | Fratelli ................ B60L 15/20 |
| 2018/0138730 | A1* | 5/2018 | Fuchs .................... B60L 53/14 |
| 2018/0215278 | A1* | 8/2018 | Yabuuchi .............. H01M 10/48 |
| 2018/0281602 | A1 | 10/2018 | Strasser |
| 2019/0210475 | A1 | 7/2019 | Pfeilschifter et al. |
| 2022/0231537 | A1* | 7/2022 | Hirota ..................... H02J 7/16 |

FOREIGN PATENT DOCUMENTS

| | | |
|---|---|---|
| CN | 105915092 A | 8/2016 |
| CN | 107592954 A | 1/2018 |
| CN | 107733055 A | 2/2018 |
| CN | 109414997 A | 3/2019 |
| DE | 102006001764 A1 | 3/2007 |
| DE | 102014009088 A1 | 11/2014 |
| DE | 102014218817 A1 | 3/2016 |
| DE | 102016207378 A1 | 11/2017 |
| DE | 102016213072 A1 | 1/2018 |
| DE | 102016122008 A1 | 5/2018 |
| DE | 102017213682 A1 | 2/2019 |
| DE | 102018006810 A1 | 2/2019 |
| DE | 10 2017 222 554 A1 | 6/2019 |
| DE | 102017222192 A1 | 6/2019 |
| EP | 2672600 A2 | 12/2013 |
| KR | 20190001927 A | 1/2019 |
| WO | 2019170730 A1 | 9/2019 |

OTHER PUBLICATIONS

Office Action (Notice to Submit Response) issued Jan. 24, 2024, by the Korean Intellectual Property Office in corresponding Korean Patent Application No. 10-2022-7015614 and an English translation of the Office Action. (9 pages).

German Examnation Report for German Application No. 10 2019 215 855.2, dated Jun. 10, 2020 with translation, 13 pages.

International Search Report and Written Opinion for International Application No. PCT/EP2020/078114, dated Jan. 20, 2021, 9 pages.

International Search Report and Written Opinion for International Application No. PCT/EP2020/078114, dated Jan. 20, 2021, 14 pages (German).

International Search Report and Written Opinion for International Application No. PCT/EP2020/078142, dated Jan. 22, 2021, 7 pages.

International Search Report and Written Opinion for International Application No. PCT/EP2020/078142, dated Jan. 22, 2021, 12 pages (German).

German Decision to Grant a Patent for German Application No. 10 2019 007 347.9, dated Sep. 8, 2021 with partial translation, 9 pages.

Office Action (The First Office Action) issued Dec. 21, 2023, by the State Intellectual Property Office of People's Republic of China in Chinese Patent Application No. 202080072112.1 and an English translation of the Office Action. (23 pages).

Korean Notice to Submit Response for Korean Application No. 10-2022-7015613, dated Oct. 30, 2023 with translation, 14 pages.

Office Action (Notice of Allowance) issued Jul. 20, 2024 by the Korean Intellectual Property Office in Korean Patent Application No. 10-2022-7015613 and an English translation of the Office Action. (4 pages).

Office Action (The Second Office Action) issued Aug. 29, 2024, by the National Intellectual Property Administration, P. R. China in corresponding Chinese Patent Application No. 202080072112.1 and an English/German translation of the Office Action. (23 pages).

Office Action issued by the U.S. Patent and Trademark Office in the U.S. Appl. No. 17/768,727, mailed Oct. 17, 2024, U.S. Patent and Trademark Office, Alexandria, VA. (8 pages).

Notice of Allowance issued Sep. 30, 2024, by the Korean Intellectual Property Office in corresponding Korean Patent Application No. 10-2022-7015614 and an English translation of the Notice of Allowance. (3 pages).

* cited by examiner

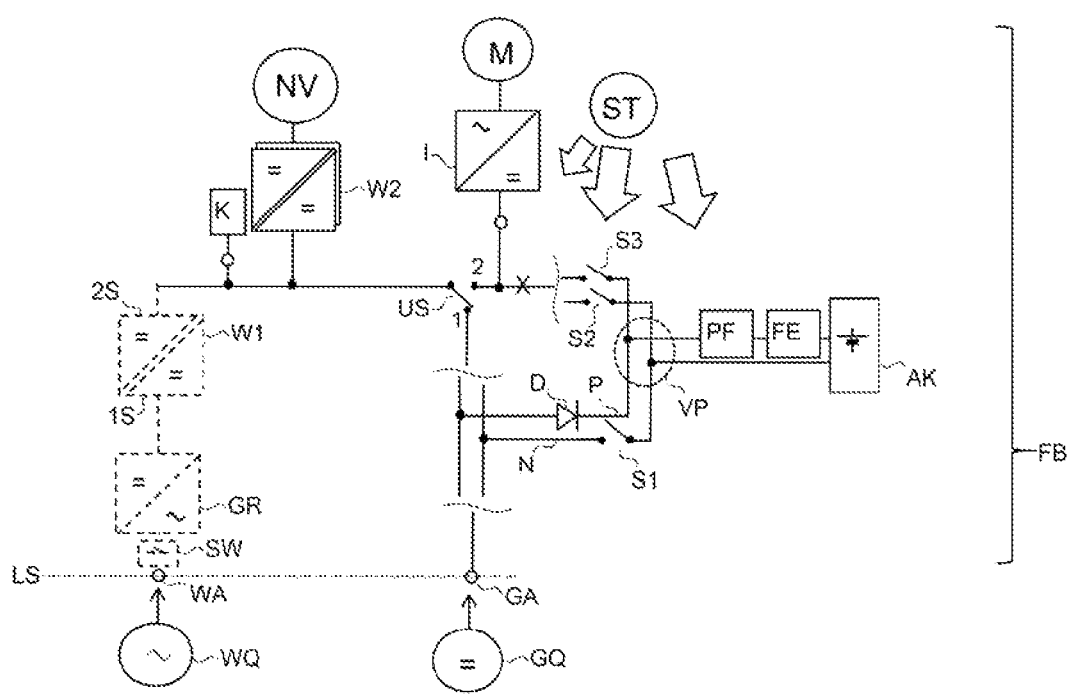

VEHICLE ELECTRICAL SYSTEM

CROSS REFERENCE TO RELATED APPLICATIONS

This application is the U.S. National Phase Application of PCT International Application No. PCT/EP2020/078142, filed Oct. 7, 2020, which claims priority to German Patent Application No. 10 2019 007 347.9, filed Oct. 21, 2019, the contents of such applications being incorporated by reference herein.

BACKGROUND OF THE INVENTION

Vehicles with an electric drive have a rechargeable battery, which, in the case of plug-in vehicles, can be charged from the outside by means of a charging connection. Furthermore, there are components within the vehicle with a nominal voltage of, for example, 800 volts (such as the high-voltage rechargeable battery), while a different voltage of 400 volts can be provided at the charging input depending on the charging station. There are therefore several sections within the electrical system that have different nominal voltages but are connected directly or indirectly to the rechargeable battery.

SUMMARY OF THE INVENTION

It is also an aspect of the invention to show a possibility with which a vehicle electrical system can be designed in such a way that, on the one hand, different nominal voltages within the vehicle electrical system are possible and, on the other hand, the vehicle can be charged and driven in a manner protected against excessive contact voltages despite the different nominal voltages in sections of the vehicle electrical system.

Further embodiments, features, properties and advantages emerge from the dependent claims, the description and the FIGURE.

A vehicle electrical system having at least one high-voltage consumer, a DC charging connection, a rechargeable battery and a changeover switch is proposed. The changeover switch can be used to set whether the high-voltage consumer is connected to a first path that leads to the rechargeable battery (via a switching device) or whether the high-voltage consumer is connected to a second path that leads to the DC charging connection. As a result, the DC charging connection can be disconnected from the first path, with the result that filter capacitances (Cy capacitances) in the first path do not affect the DC charging connection, while the high-voltage consumer is supplied both when charging and in a driving mode, namely by means of voltage that comes from the DC charging connection (when charging) or by means of the rechargeable battery voltage (in driving mode). An electric drive, which can have high Cy capacitances, in particular for filter purposes, can be connected in the first path. This path can be disconnected from the DC charging connection and the high-voltage consumer by way of the changeover switch and by way of a switching device during the DC charging, while the DC charging connection and the high-voltage consumer are connected to the rechargeable battery. This makes charging possible and the high-voltage consumer can be supplied with voltage at the same time.

The high-voltage consumer is connected to the rechargeable battery by means of the changeover switch in a first switching position of the changeover switch via a first switching device. The high-voltage consumer is connected to the rechargeable battery by means of the changeover switch in a second switching position of the changeover switch via a second switching device. In the second switching position, the high-voltage consumer is connected to the first path which connects the changeover switch to the rechargeable battery via the second switching device. In the first switching position, the high-voltage consumer is connected to the second path which connects the changeover switch and the DC charging connection to the rechargeable battery via the second switching device. The rechargeable battery is connected to a connecting point. From the connecting point, the first and the second path lead (in each case in an interruptible or switchable manner) to the changeover switch. The changeover switch optionally connects one of the two paths and thus one of the two switching units (of the paths) to the high-voltage consumer.

Furthermore, the DC charging connection can be disconnected from the rechargeable battery by means of the switching device. An electric drive, which is connected to the rechargeable battery via the second switching device, can also be disconnected therefrom by way of switching. Both for driving and for charging, there are thus possibilities of disconnecting the rechargeable battery in order to be able to avoid high contact voltages. In particular, the procedure allows a high voltage stored in the electric drive (such as the voltage of the intermediate circuit of the electric drive) to be isolated by means of the switching devices in order to be able to avoid high contact voltages.

The switching devices each have two poles and comprise a switching element for each of the two potentials (+ and −). The switching devices are each capable of disconnecting or connecting all poles. The switching elements are in particular electromechanical switching elements or else a semiconductor switch. The switching elements of a switching device can be designed as a (two-pole) electromechanical switch such as a relay. The switching device can thus be implemented by a relay. The first and/or the second switching device is/are preferably designed as a double relay.

One embodiment makes provision for the first switching unit to be provided by a switch unit (at one potential) and a diode (at the other potential). The diode conducts in the direction in which the charging current of the relevant potential flows to the rechargeable battery. The diode can be provided at the positive potential. If the diode is at the positive potential, then the forward direction leads from the DC charging connection to the connecting point or to the rechargeable battery. If the diode is at the negative potential or the ground potential, then the forward direction points away from the connecting point or from the rechargeable battery and toward the DC charging connection. The diode is preferably a power diode. The diode has the function of the diode, but does not necessarily have to be realized by a single diode component; instead it may have further diode components or may have other components that realize the diode function, for instance a transistor which is controlled in accordance with a diode function. Therefore, no specific component is defined as a diode, but the function as a diode or a function like a diode is referred to.

The first switching device connects two potentials of the DC charging connection (in short: DC connection) to two potentials of the connecting point or the rechargeable battery. The two potentials are, for example, a negative potential and a positive potential or a positive potential and a ground potential. The switching device provides a switching element for one of the potentials. The switching device provides a diode device or another switching element for the other potential. These are connected in series.

The potentials are in each case DC voltage potentials. A DC voltage is applied between the potentials. In particular, each potential corresponds in each case to a (DC) busbar, which can also be referred to as a DC busbar or DC conductor. A supply voltage is applied between the potentials, in particular a high-voltage supply voltage. The potentials are in particular high-voltage potentials.

The second switching device connects two potentials of the second side of the DC-DC converter to two potentials of the connecting point. In this case, the switching device connects a first potential of the second side to a first potential of the connecting point by means of a first switchable connection and the second potential of the second side to the second potential of the connecting point by means of a second switchable connection. The second switching device thus connects the potentials individually in each case. The switching device has a switching element for each potential. The switching element can be designed as an electromechanical switching element or as a semiconductor switching element, such as a transistor. In particular, the two switching elements are formed by the contacts of a double relay.

Provision can also be made for the connecting point to be connected to the rechargeable battery via a pyrofuse. A pyrofuse is an electrical connection that can be opened using an explosive. The explosive is triggered by an electric igniter. When triggered, the explosive mechanically disconnects an electrical connection. The pyrofuse is preferably connected in series at the same potential as the diode, provided the first switching device is equipped with a diode. The pyrofuse can be designed having two poles. A controller in the sense of a control device can be provided, which is set up to actuate the switching devices according to an open state or to open said switching devices. The controller is also set up to trigger the pyrofuse only if at least one of the switching devices does not open despite appropriate actuation or if a high potential or high voltage is still detected despite appropriate actuation. For this purpose, the controller is connected to the switching devices and the pyrofuse in a controlling manner. In particular, the controller is set up to first activate the switching devices and then, after checking the effect of the opening of the switching devices, to trigger the pyrofuse if, despite opening, a high potential (on a side of the pyrofuse facing away from the rechargeable battery) can be detected.

The connecting point or the two switching devices can be connected to the rechargeable battery via a disconnecting device. During maintenance, for example, the disconnecting device can be used to disconnect the sections of the vehicle electrical system from the power supply. The disconnecting device is connected in series at the same potential as the diode, provided the diode is provided in the first switching device. In particular, the disconnecting device is at the same potential (or in the same busbar) as the pyrofuse or can be designed having two poles. The disconnecting device can be present between the pyrofuse and the rechargeable battery. Furthermore, the pyrofuse can be present between the disconnecting device and the rechargeable battery. Both the pyrofuse and the disconnecting device, if present, can only be provided at one of the two potentials (in particular at the potential of the diode, if present), while the other potential is transferred by a direct connection between the connecting point and the rechargeable battery.

The disconnecting device may be a circuit breaker with an isolating function, a power circuit breaker, a fuse, a switch disconnector, a residual current circuit breaker or a plug-in device. The disconnecting device is preferably a removable jumper. If said jumper is removed from a holder, then two contacts are disconnected from each other, while the two contacts are connected to each other by the jumper when the jumper is plugged in.

The vehicle electrical system can be equipped with a rectifier. An AC charging connection can also be provided, which is connected to the first side of a DC-DC converter via the rectifier. The second side of a DC-DC converter is connected (directly) to the at least one high-voltage consumer. A further switching device can be provided, which is provided between the first side of the DC-DC converter and the first switching device. The DC charging connection can be connected directly to the first switching device or the changeover switch or it can be connected to the first switching device or the changeover switch via the further (safety) switching device.

Another DC-DC converter (hereinafter: additional converter) can be provided as high-voltage consumer. Said additional converter can have a first side, which is connected to the first side of the DC-DC converter. A second side of the additional converter can be connected to a low-voltage electrical system, such as an electrical system section that has an end voltage of approximately 12, 13, 14, 24 or 48 volts.

Additional high-voltage consumers can be provided, which are connected to the changeover switch (which connects the consumers to the first or the second switching device in a switchable manner). This may involve, for example, a heating device, in particular an electrical heating device of a catalytic converter, or an air-conditioning device such as an electrical air conditioning-compressor or an electrical interior heating element, for example. A further switch can be provided between the at least one high-voltage consumer and the changeover switch. This switch can be designed as a semiconductor fuse, in particular as an IGBT, with which a diode is connected in parallel. In the event of a fault, the semiconductor fuse is opened by a control signal.

The rechargeable battery and the disconnecting device, the rechargeable battery and the pyrofuse or the rechargeable battery, the disconnecting device and the pyrofuse can be provided in one housing, while the remaining components of the vehicle electrical system are provided in at least one other housing.

The vehicle electrical system is preferably a high-voltage electrical system with a nominal voltage of at least 60 volts, 100 volts, 200 volts, 400 volts or 800 volts (at least in sections). The rechargeable battery is preferably a rechargeable traction battery, in particular a high-voltage rechargeable battery. The rechargeable battery can be a rechargeable lithium battery. The rechargeable battery has a nominal voltage of 400 volts or 800 volts, for example. The rectifier between the AC charging connection and the first side of the DC-DC converter can be an uncontrolled rectifier, a controlled rectifier, or a power factor correction filter. In addition, a further voltage converter may be provided between the rectifier and the DC-DC converter. A filter may be provided between the first side of the DC-DC converter and the first switching device.

The vehicle electrical system can have an electric drive. The electric drive can have in particular an inverter and an electric machine connected thereto. The electric drive (in particular the inverter) is connected to the rechargeable battery via the second switching unit. Alternatively or in combination with this, the electric drive can be connected to the high-voltage consumer via the changeover switch when the changeover switch is in the second switching position. If the changeover switch is in the second switching position, then the electric drive can be supplied from the rechargeable battery or can recuperate into it. This assumes that the second switching unit is closed. In this case, which can also be referred to as the driving state, the electric drive is therefore connected to the rechargeable battery. At the same time, the first switching unit is preferably open. As a result of the fact that the changeover switch is designed as such, there is no connection between the electric drive and the DC charging connection, especially since the changeover switch should be in the first switching position and not in the second switching position. As a result, the DC charging connection is disconnected when the rechargeable battery is connected to the electric drive or to the high-voltage consumer, with the result that Cy capacitances (=filter capacitances for discharging AC components to ground) of the electric drive, which can be relatively high, cannot affect the DC charging connection. Furthermore, it is ensured that in driving mode the DC voltage connection is disconnected from the rechargeable battery and from the electric drive as well as from the high-voltage consumer. In particular, this prevents high contact voltages at the DC charging connection when the changeover switch is in the second switching position and in particular when the first switching unit is open.

The electric drive can be connected to a connection which connects the changeover switch to the second switching unit, in particular in a direct manner. The electric drive can therefore be connected between the changeover switch and the second switching unit. The high-voltage consumer can be connected to the changeover switch on the side of the changeover switch that faces away from the second switching unit. The changeover switch US can thus be located between the electric drive and the high-voltage consumer. The electric drive is thus connected to a side of the second switching unit that faces the changeover switch. The electric drive is connected to a side of the changeover switch that faces the second switching unit.

The DC charging connection can be connected to a connection which connects the changeover switch to the second switching unit. In other words, the DC charging connection can be connected to a side of the first switching unit that faces away from the rechargeable battery. In particular, the DC charging connection can be connected to a side of the changeover switch that faces the first switching unit. In one embodiment, the changeover switch comprises first contacts and second contacts that can be selectively connected to the high-voltage consumer. In this case, the first contacts are connected (directly) to the DC charging connection. The first contacts are connected in particular to the side of the first switching unit that faces away from the rechargeable battery. The second contacts of the changeover switch can be connected directly to the second switching unit. In particular, the second contacts can be connected directly to the electric drive or to the inverter thereof. The second contacts are connected to that side of the second switching unit that faces away from the rechargeable battery. The sides of the switching units that are connected to the changeover switch or to the first and second contacts thereof are opposite to the sides that are connected to the rechargeable battery.

The vehicle electrical system can also have an AC voltage connection. Furthermore, a rectifier can be provided, to which the AC voltage connection is connected. In this case, the AC voltage connection is connected to an AC voltage side of the rectifier. The AC voltage connection is connected to the high-voltage consumer. If the changeover switch is in the second switching position, then the AC voltage connection is connected to the rechargeable battery via the rectifier (and the second switching unit). The rectifier is preferably connected to a side of the changeover switch that is connected to the high-voltage component. The AC voltage connection can also be connected to a point where the electric drive is connected to the second switching device. The AC voltage connection can thus be connected via the rectifier to the connection between the second switching unit and the changeover switch or to the second contacts of the changeover switch. As a result, energy can be fed into the rechargeable battery via the AC voltage connection and the rectifier as well as via the changeover switch and the second switching unit. In such an AC charging state, the first switching unit is preferably open. Furthermore, the changeover switch is in a position in which the rectifier is connected to the second switching unit. As a result, the DC charging connection is disconnected from the rechargeable battery and from the rectifier via the changeover switch on the one hand and the open first switching unit on the other hand.

The changeover switch has in particular two poles, such that the first and second contacts are each doubled, with in each case a first contact and a second contact being reserved for the positive potential and a further first contact and a further second contact being assigned to the negative potential or a ground potential.

It is possible to provide a DC-DC converter which changes the level of the voltage rectified by the rectifier in order to charge the rechargeable battery with a correspondingly high voltage via the changeover switch and the second switching unit. The rectifier is connected via the DC-DC converter to the side of the changeover switch that is connected to the high-voltage component. The rectifier is connected by way of the DC-DC converter to the side of the changeover switch which is opposite to the first and second contacts and is connected in particular to the high-voltage component. A further possibility is that the rectifier is connected to the second contacts of the changeover switch via the DC-DC converter, that is to say to the second switching unit and in particular to the side of the switching unit which faces the changeover switch.

The high-voltage component can be an electric heater, such as an air-conditioning system and/or an electric heater of an electrically heatable exhaust gas catalytic converter. Furthermore, alternatively or in combination with this, an electric air-conditioning compressor (or the drive thereof) and/or an additional DC-DC converter can be provided, which is provided as a high-voltage component and is connected accordingly to a high-voltage component. The additional DC-DC converter is in particular a DC-DC converter to which a low-voltage network is connected, for example a low-voltage network with a nominal voltage of 12 volts, 13, 14, 24, 36 or 48 volts. The one or more high-voltage components can be fed from the rechargeable battery or, if it is connected, via the DC charging connection or also the rectifier or the DC-DC converter via the AC charging connection.

One embodiment makes provision for the vehicle electrical system to have a controller that is connected to the changeover switch in a controlling manner. The controller has a vehicle state. In this vehicle state, the controller controls the changeover switch to assume the second switching position. Furthermore, a charging state, in particular a DC charging state, can be provided. In this charging state, the controller controls the changeover switch to control the first switching position. In the driving state, the changeover switch thus connects the rechargeable battery to the high-voltage components. In the charging state or DC charging state, the changeover switch disconnects the DC charging connection from the electric drive and in particular connects the DC charging connection to the at least one high-voltage consumer. In addition, in the DC charging state, the DC charging connection is connected to the rechargeable battery via the first switching unit.

The controller is preferably also connected to the switching devices in a controlling manner. In the driving state, the controller controls the first switching device in an open state. Furthermore, in the driving state, the controller controls the second switching device in a closed state. The DC charging connection is disconnected from the battery by the open first switching device, such that no dangerous voltage can be present at the DC charging connection when driving. The rechargeable battery is connected to the electric drive by the closed second switching device. Since the changeover switch is preferably in the second switching position here, the at least one high-voltage consumer is also supplied with electrical energy from the rechargeable battery via the changeover switch. In the DC charging state, the controller controls the first switching device in a closed state and the second switching device in an open state. With regard to the switching device, the switching positions in the driving state and in the DC charging state are therefore complementary to one another.

In the DC charging state, a power path between the DC charging connection and the rechargeable battery is provided via the first switching device. However, the rechargeable battery is disconnected from the vehicle drive by the open second switching device. Since the changeover switch is in the first switching position here, the DC charging connection is connected to the at least one high-voltage consumer, such that the at least one high-voltage consumer can be supplied with power as a result. However, since the changeover switch is not in the second position, in the DC charging state, the electric drive is also cut off on the changeover switch side. Thus, the Cy capacitors of the electric drive are disconnected from the rest of the vehicle electrical system when the vehicle electrical system or the controller and the relevant devices are in the DC charging state.

The changeover switch and the first and second switching units are each preferably designed having two poles. In this case, in each case one switching element is provided for a positive and a negative potential (or ground potential). Therefore, the changeover switch and the switching units each have a single pole with regard to the two potentials of the vehicle electrical system.

The changeover switch and/or switching units or switching elements thereof are in particular electromechanical switches.

BRIEF DESCRIPTION OF THE DRAWINGS

The FIGURE is used to explain embodiments of the vehicle electrical system described here.

DETAILED DESCRIPTION OF THE PREFERRED EMBODIMENTS

The vehicle electrical system FB illustrated in the FIGURE is connected to external voltage sources via a charging interface LS, namely to the AC voltage source WQ and the DC voltage source GQ. These sources can be implemented as a charging station, for example. The vehicle electrical system FB comprises an AC voltage connection WA and a DC voltage connection GA. It should be noted that the AC voltage connection WA is optional. The connections WA, GA are part of the charging interface LS.

A rechargeable battery AK of the vehicle electrical system is connected to a connecting point VP, it being shown that this connection leads via the optional elements PF (pyrofuse) and FE (disconnecting device). These two optional components are provided at the same potential. A first switching unit comprises a switching element S1 for the potential N (negative potential) and a diode D for the positive potential P. The diode has a forward direction that points in the current direction that is set for the charging current of the DC charging connection. However, instead of the diode D, a further switching element is preferably used, which is connected instead of the diode at the point at which the diode is provided. A second switching unit comprises the switching elements S1 and S2, with a switch or a switching element being provided here for each potential N, P as well. The switch S2 is provided at the negative potential N and the switch S3 is provided at the positive potential P. The switching elements are each connected in series (at the relevant potential). As a result, the respective potential-carrying line can be disconnected and connected in a controlled manner.

Parallel paths, each of which comprising one of the two switching units, lead away from the connecting point VP or from the rechargeable battery AK. One of the two switching units is provided in each of the paths (connected in series); different switching units are provided in different paths. A changeover switch US is also connected to the switching units, but on the side opposite the connecting point or rechargeable battery. The changeover switch is the first switching unit and connects a first (two-pole) contact or connection (corresponding to switching position 1) of the changeover switch US to the rechargeable battery or the connecting point VP. A second (two-pole) contact or connection of the changeover switch US, which corresponds to switching position 2, is connected to the connecting point or to the rechargeable battery AK via the second switching unit.

The center connection of the changeover switch US, that is to say the connection which can be connected selectively to switching positions 1 or 2 depending on the switching position, is connected to at least one high-voltage consumer. Here, the high-voltage consumers K and W2 are provided. The at least one high-voltage consumer K can stand for a heating element (of the air-conditioning system or an exhaust gas after-treatment system) and/or for an electric air-conditioning compressor (or the drive thereof) and/or for other components.

An electric drive comprises an inverter I and an electric machine M, which is connected via the inverter I to the changeover switch US (in particular to the second contact/connection thereof) and to the second switching unit S2, S3. The changeover switch US is connected between the electric drive (traction drive) on the one hand and the at least one high-voltage consumer or the first switching unit S1, D on the other hand. The at least one high-voltage consumer can thus be connected selectively to the first switching unit S1, D or to the second switching unit S2, S3.

The DC charging connection GA is connected to a connection between the first switching unit S1, D and the changeover switch US (in particular the first contact 1 thereof). In other words, the DC charging connection GA is connected to a first path that leads from the rechargeable battery or from the connecting point to the changeover switch, while the electric drive is connected to a second path that connects the connecting point VP or the rechargeable battery to the changeover switch US.

A controller ST is connected in a controlling manner to the switches S1 to S3 (in the case of a switching element in the step of the diode also to this switching element) and to the changeover switch US in a controlling manner. In a charging operation, the DC voltage connection is connected to the connecting point or the rechargeable battery AK via the charging unit S1, D, which is then closed. In the charging state, the second switching unit is open, such that there is no connection to the electric drive I, M from the side of the second switching unit. In the charging state, the changeover switch US is in switching position 1 and thereby connects the at least one high-voltage consumer to the connecting point VP or to the rechargeable battery AK on the one hand and to the DC charging connection GA on the other hand. As a result, the high-voltage consumers K, W2 and NV receive a supply voltage, while the switch position of the changeover switch US in switching position 1 and the open second switching unit S2, S3 disconnect the inverter and thus the entire electric drive I, M. As a result, the Cy capacitors do not affect the DC charging connection GA. A high contact voltage is thus avoided.

As mentioned, heating elements and/or an electric air-conditioning compressor can be provided as high-voltage consumers. These are represented symbolically as component K. An additional DC-DC converter W2, which connects the center connection of the changeover switch US to a low-voltage vehicle electrical system NV in a voltage-converting manner, can be provided as a further high-voltage consumer. A multi-phase additional DC-DC converter W2 is illustrated, which is DC-isolating, this output being just one example of many. The low-voltage vehicle electrical system can have a nominal voltage of 12 volts, 13 volts or 14 volts or other values below 60 volts.

As an optional configuration, an AC voltage connection WA can be provided, which is connected in particular to a rectifier GR via an optional switch SW. The rectifier GR thus connects the AC voltage connection to a DC-DC converter W2, in particular to a first side 1S of the DC-DC converter W1. A second side 2S of the DC-DC converter is connected to the at least one high-voltage consumer K, W2, NV.

Now that the switch position in the charging state for the case of DC voltage (=DC voltage charging state) has been described above, an AC voltage charging state is described below. In this case, the changeover switch US is in the second switching state 2 (that is to say the center connection is connected to the connection in switching position 2) and the second switching unit is closed, while the first switching unit is open. As a result of the fact that the changeover switch US does not connect the DC-DC converter W2 to the DC charging connection GA here and due to the first switching device S1, which is open, no voltage that results from AC charging (in particular the voltage on the second side 2S) is applied to the DC charging connection GA. Since in this case the DC-DC converter W1 is also a DC-isolating converter, the Cy capacitors of the inverter I and of the electric machine M do not act on the AC charging connection WA.

An alternative connection point for the DC charging connection is marked with an X, this point being between the second switching unit S2, S3 and the changeover switch US. In this case, the DC charging connection is connected directly to the inverter I (and thus also to the electric machine M), it being possible for the Cy capacitors to be switchable and switched off in the charging state.

The connections shown to the left of the second switching unit and above and below the connecting point between the first switching unit, changeover switch and DC charging connection are shown with a single line for simplification. However, these connections are to be understood as two-wire connections and are designed in the same way as those connections which are shown explicitly with two potentials and thus with two lines in the FIGURE. The single line thus stands in particular for a two-wire connection with two potentials (N, P).

In general, starting from the first switching device (equipped with two switching elements or with one switching element and one diode) up to the connecting point of the DC charging connection and the changeover switch, a DC-DC converter (buck or boost) can be provided. The controller can be connected to the DC-DC converter in a controlling manner and be set up to open the (operating) switch or switches of the DC-DC converter in the event of an overcurrent. If the first switching device is designed with a diode D, this forms the working diode of the DC-DC converter. If the DC-DC converter is designed as a step-up converter, then the working diode, which follows the working inductance, is formed by the diode D. Since in one embodiment the diode D is part of both the DC-DC converter and the first switching unit, the DC-DC converter and the first switching unit can be partially integrated into one another and can in particular share one component, namely the diode.

Even in a circuit without a changeover switch as shown in the application DE 10 2019 215 855, incorporated herein by reference, a DC-DC converter (boost, step-up converter) can be provided between the first switching unit and the connecting point of the DC charging connection, the working diode of which DC-DC converter is realized by the diode device. The diode or diode device can therefore be integrated in a DC-DC converter which is integrated with the first switching device.

The invention claimed is:

1. A vehicle electrical system comprising:
   at least one high-voltage consumer;
   a DC charging connection;
   a rechargeable battery; and
   a changeover switch,
   wherein the high-voltage consumer is connected to the rechargeable battery by the changeover switch via a first switching device in a first switching position of the changeover switch and is connected to the rechargeable battery by the changeover switch in a second switching position of the changeover switch via a second switching device,
   wherein the DC charging connection is connected to the rechargeable battery via the first switching device.

2. The vehicle electrical system as claimed in claim 1, further comprising an electric drive, which is connected to the rechargeable battery via the second switching device and which is connected to the high-voltage consumer by the changeover switch in a second switching position of the changeover switch.

3. The vehicle electrical system as claimed in claim 2, wherein the electric drive is connected to a connection which connects the changeover switch to the second switching unit.

4. The vehicle electrical system as claimed in claim 1, wherein the DC charging connection is connected to a connection which connects the changeover switch to the first switching device.

5. The vehicle electrical system (FB) as claimed in claim 1, further comprising an AC voltage connection and a rectifier which is connected to one side of the changeover switch which is connected to the high-voltage consumer, or is connected to a point of a connection between the electric drive and the second switching device.

6. The vehicle electrical system as claimed in claim 5, further comprising a first DC-DC converter via which the rectifier is connected to the side of the changeover switch which is connected to the high-voltage component or via which the rectifier is connected to the point of the connection between the electric drive and the second switching device.

7. The vehicle electrical system as claimed in claim 1, wherein the high-voltage consumer is designed as an electric heater of an air-conditioning system or as an electrically heatable exhaust gas catalytic converter and/or as an additional DC-DC converter.

8. The vehicle electrical system as claimed in claim 1, wherein the changeover switch and the first switching device and the second switching device are designed having two poles.

9. A vehicle electrical system comprising:
   at least one high-voltage consumer;
   a DC charging connection;
   a rechargeable battery;
   a rectifier;
   a changeover switch; and
   a controller which is connected to the changeover switch in a controlling manner and which has a driving state in which the controller controls the changeover switch to set the second switching position, and wherein the controller has a DC charging state in which the controller controls the changeover switch to set the first switching position,
   wherein the high-voltage consumer is connected to the rechargeable battery by the changeover switch via a first switching device in a first switching position of the changeover switch and is connected to the rechargeable battery by the changeover switch in a second switching position of the changeover switch via a second switching device, and
   wherein the DC charging connection is connected to the rechargeable battery via the first switching device.

10. The vehicle electrical system as claimed in claim 9, wherein the controller is also connected in a controlling manner to the first switching device and to the second switching device, wherein the controller in the driving state controls the first switching device in an open state and controls the second switching device in a closed state and wherein the controller in the DC charging state controls the first switching device in a closed state and controls the second switching device in an open state.

* * * * *

UNITED STATES PATENT AND TRADEMARK OFFICE
CERTIFICATE OF CORRECTION

PATENT NO. : 12,208,695 B2
APPLICATION NO. : 17/768338
DATED : January 28, 2025
INVENTOR(S) : Franz Pfeilschifter It is certified that error appears in the above-identified patent and that said Letters Patent is hereby corrected as shown below:

In the Claims

In Column 10, Line 64 in Claim 5 delete the word "(FB)".

Signed and Sealed this
Twenty-fifth Day of March, 2025

Coke Morgan Stewart
*Acting Director of the United States Patent and Trademark Office*